United States Patent
Charrow et al.

(10) Patent No.: US 11,938,967 B2
(45) Date of Patent: Mar. 26, 2024

(54) PREPARING AUTONOMOUS VEHICLES FOR TURNS

(71) Applicant: Waymo LLC, Mountain View, CA (US)

(72) Inventors: Benjamin Charrow, Millbrae, CA (US); Nathaniel Fairfield, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 95 days.

(21) Appl. No.: 17/215,574

(22) Filed: Mar. 29, 2021

(65) Prior Publication Data
US 2021/0240184 A1 Aug. 5, 2021

Related U.S. Application Data

(63) Continuation of application No. 15/454,271, filed on Mar. 9, 2017, now Pat. No. 11,009,875.

(51) Int. Cl.
*B60W 30/18* (2012.01)
*B60W 60/00* (2020.01)
(Continued)

(52) U.S. Cl.
CPC .. *B60W 60/0016* (2020.02); *B60W 30/18154* (2013.01); *G08G 1/166* (2013.01); *G08G 1/167* (2013.01); *B60W 2420/403* (2013.01); *B60W 2420/52* (2013.01); *B60W 2420/54* (2013.01); *B60W 2552/53* (2020.02); *B60W 2554/60* (2020.02); *B60W 2554/80* (2020.02); *B60W 2554/802* (2020.02); *B60W 2556/40* (2020.02);
(Continued)

(58) Field of Classification Search
None
See application file for complete search history.

(56) References Cited

U.S. PATENT DOCUMENTS

| 8,346,426 B1 | 1/2013 | Szybalski et al. |
|---|---|---|
| 8,457,827 B1 | 6/2013 | Ferguson et al. |

(Continued)

FOREIGN PATENT DOCUMENTS

| KR | 20100056883 A | 5/2010 |
|---|---|---|
| KR | 20140135828 A | 11/2014 |

(Continued)

OTHER PUBLICATIONS

Extended European Search Report for Application No. EP20206551 dated Feb. 9, 2021.
(Continued)

*Primary Examiner* — Jeffrey C Boomer
(74) *Attorney, Agent, or Firm* — Botos Churchill IP Law

(57) ABSTRACT

The technology relates to maneuvering a vehicle prior to making a turn from a current lane of the vehicle. As an example, a route that includes making the turn from the lane is identified. An area of the lane prior to the turn having a lane width of at least a predetermined size is also identified. Sensor data identifying an object within the lane is received from a perception system of a vehicle. Characteristics of the object, including a location of the object relative to the vehicle, are identified from the sensor data. The vehicle is then maneuvered through the area prior to making the turn using the identified characteristics.

23 Claims, 16 Drawing Sheets

(51) Int. Cl.
  *G08G 1/16* (2006.01)
  *G06V 20/56* (2022.01)
(52) U.S. Cl.
  CPC ... *G05D 2201/0213* (2013.01); *G06V 20/588* (2022.01)

(56) References Cited

U.S. PATENT DOCUMENTS

| | | | |
|---|---|---|---|
| 9,081,383 | B1 | 7/2015 | Montemerlo et al. |
| 9,248,834 | B1 | 2/2016 | Ferguson et al. |
| 9,493,157 | B2 | 11/2016 | Prokhorov |
| 2009/0096661 | A1* | 4/2009 | Sakamoto ............. G01S 13/345 342/92 |
| 2010/0332127 | A1 | 12/2010 | Imai et al. |
| 2014/0297094 | A1 | 10/2014 | Dolgov |
| 2014/0297116 | A1* | 10/2014 | Anderson ............. H02K 29/08 701/37 |
| 2014/0379258 | A1* | 12/2014 | Beaurepaire ....... G01C 21/3685 701/533 |
| 2016/0005312 | A1 | 1/2016 | Gao et al. |
| 2016/0176398 | A1 | 6/2016 | Prokhorov et al. |
| 2016/0229409 | A1 | 8/2016 | Pascheka et al. |
| 2017/0174261 | A1* | 6/2017 | Micks ................ B62D 15/0255 |
| 2017/0176993 | A1 | 6/2017 | Kato et al. |
| 2017/0210383 | A1 | 7/2017 | Nishimura |
| 2017/0236413 | A1* | 8/2017 | Takagi .................. B60W 40/04 701/117 |
| 2018/0001894 | A1* | 1/2018 | Masui ................... B60W 10/06 |
| 2018/0024564 | A1 | 1/2018 | Matsuda |
| 2018/0217604 | A1* | 8/2018 | Nakajima .......... G01C 21/3492 |

FOREIGN PATENT DOCUMENTS

| | | |
|---|---|---|
| KR | 20160136640 A | 11/2016 |
| WO | 2013138000 A1 | 9/2013 |
| WO | 2016110728 A1 | 7/2016 |

OTHER PUBLICATIONS

Korean Office Action for Application No. KR10-2019-7025986 dated Oct. 20, 2020.
"International Search Report and Written Opinion received for International Application No. PCT/US2018/021050, dated Jun. 21, 2018", 12 pages.
Office Action for Chinese Patent Application No. 201880017004.7, dated Jan. 12, 2022.
Korean Office Action for Application No. 10-2019-7025986 dated Apr. 5, 2021.

* cited by examiner

PREPARING AUTONOMOUS VEHICLES FOR TURNS

CROSS REFERENCE TO RELATED APPLICATIONS

The present application is a continuation of U.S. patent application Ser. No. 15/454,271, filed Mar. 9, 2017, the entire disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

These vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

In addition to the sensors, these vehicles may rely on highly detailed maps of their environment. These maps are critical for both navigation, for instance determining how to get between two locations) as well as localization (determining where the vehicle is in the world). The maps may even include guide lines which the vehicle can follow in order to maintain its position in a lane.

BRIEF SUMMARY

Aspects of the disclosure provide a method of maneuvering a vehicle prior to making a turn from a lane of a roadway. The method includes identifying, by one or more processors, a route that includes making the turn from the lane; identifying, by the one or more processors, an area of the lane prior to the turn having a lane width of at least a predetermined size; receiving, by the one or more processors, from a perception system, sensor data identifying an object within the lane; identifying, by the one or more processors, from the sensor data, characteristics of the object including a location of the object relative to the vehicle; and maneuvering, by the one or more processors, the vehicle through the area prior to making the turn using the identified characteristics.

In one example, the predetermined size is of a sufficient distance to fit the object and the vehicle side by side. In another example, the sensor data further identifies a distance between a curb and a lane line within the area and identifying the area is based on the sensor data. In another example, maneuvering the vehicle through the area includes using pre-stored map information corresponding to the area, the map information includes information identifying the lane width, and identifying the area is based on the map information.

In another example, method also includes, when the relative location of the object is in front of the vehicle, such that the object is closer to the turn than the vehicle, determining whether the object is likely to make the turn, and maneuvering the vehicle is further based on the determination. In this example, the determination is further based on whether the sensor data indicates that a turn signal of the object is activated. In addition or alternatively, the determination is further based on whether the object is stopped behind a second object such that the object and the second object appear to be stacked and are likely to proceed to turn or not turn in a same manner. In this example, the determination is further based on whether the object is further to one boundary of the area or another boundary of the area.

In another example, the method also includes, when the relative location of the object is behind the vehicle, such that the vehicle is closer to the turn than the object, determining whether the object is attempting to pass the vehicle and make the turn, and maneuvering the vehicle is further based on the determination. In this example, the determination is further based on the relative location of the object, and where the object is further than the vehicle from the turn in a lateral direction, maneuvering the vehicle includes moving the vehicle towards the turn at a predetermined distance from the turn. In addition or alternatively, the determination is further based on the relative location of the object, and where the object is closer than the vehicle from the turn in a lateral direction, maneuvering the vehicle includes allowing the object to pass by the vehicle in the lane and thereafter moving the vehicle towards the turn.

Another aspect of the disclosure provides a system for maneuvering a vehicle prior to making a turn from a lane of a roadway. The system includes one or more processors configured to: identify a route that includes making the turn from the lane; identify an area of the lane prior to the turn having a lane width of at least a predetermined size; receive, from a perception system, sensor data identifying an object within the lane; identify, from the sensor data, characteristics of the object including a location of the object relative to the vehicle; and maneuver the vehicle through the area prior to making the turn using the identified characteristics.

In one example, the predetermined size is of a sufficient distance to fit the object and the vehicle side by side. In another example, the one or more processors are further configured to, when the relative location of the object is in front of the vehicle, such that the object is closer to the turn than the vehicle, determine whether the object is likely to make the turn, and maneuvering the vehicle is further based on the determination. In this example, the one or more processors are further configured to make the determination further based on whether the object is stopped behind a second object such that the object and the second object appear to be stacked and are likely to proceed to turn or not turn in a same manner. In this example, the one or more processors are further configured to make the determination further based on whether the object is further to one boundary of the area or another boundary of the area.

In another example, the one or more processors are further configured to, when the relative location of the object is behind the vehicle, such that the vehicle is closer to the turn than the object, determine whether the object is attempting to pass the vehicle and make the turn, and maneuvering the vehicle is further based on the determination. In this example, the one or more processors are further configured to make the determination further based on relative location of the object, and where the object is further than the vehicle from the turn in a lateral direction, maneuvering the vehicle includes moving the vehicle towards the turn at a predetermined distance from the turn. In addition or alternatively, the one or more processors are further configured to make the determination further based on the relative location of the object, and when the object is closer than the vehicle from the turn in a lateral direction, maneuvering the vehicle includes allowing the object to pass by the vehicle in the lane and thereafter moving the vehicle towards the turn. In another example, the system also includes the vehicle.

DETAILED DESCRIPTION

Overview

Figure 1:
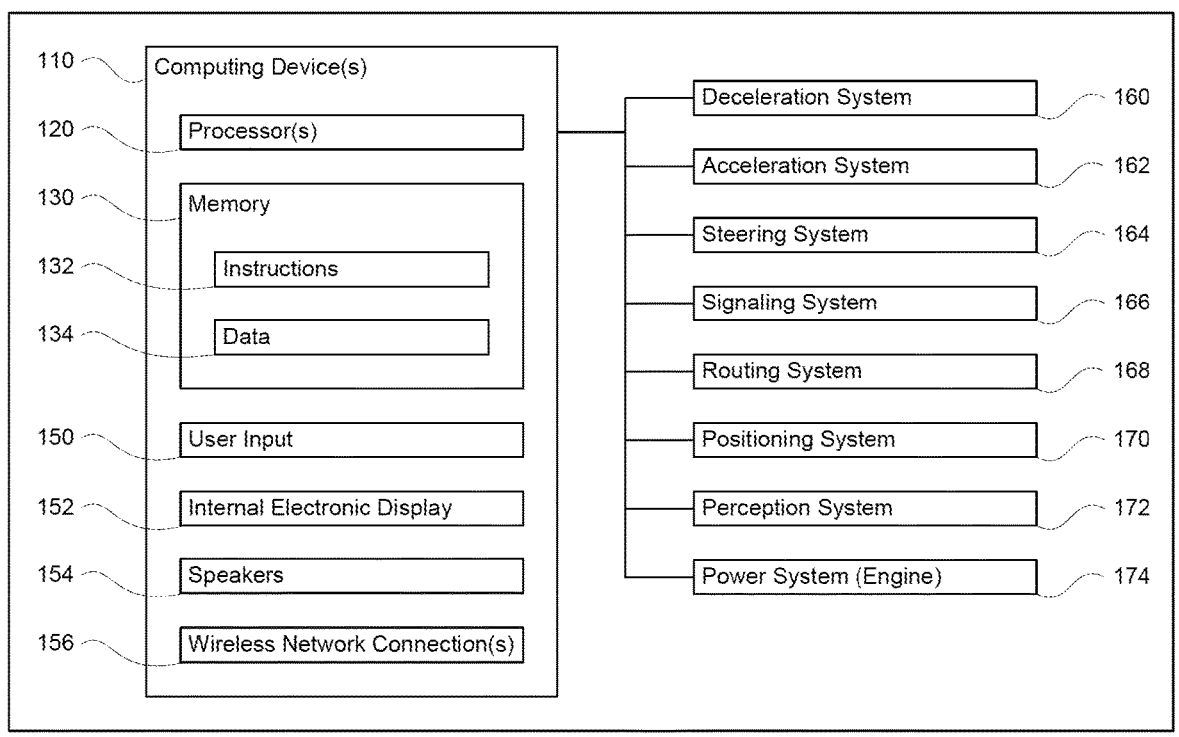
FIG. 1 is a functional diagram of an example vehicle in accordance with aspects of the disclosure.

The technology relates to controlling a vehicle autonomously as the vehicle approaches a turn, for instance, a right turn at an intersection, parking lot, driveway, etc. Many lanes provide for a wider area immediately before such turns, especially in suburban or urban areas. In such cases, the lane may be wide enough to allow for a vehicle to move to the right, while another vehicle which will presumably turn left or proceed "straight" across the intersection may move to the left, though there is no actual lane line delineating such areas.

When maneuvering between locations, these vehicles tend to follow a predetermined path which causes the vehicle to stay "centered" in the lane by maintaining a distance from a center or left side lane line or following the aforementioned map guide lines. In this regard, a vehicle may actually tend to stay to the left as a lane widens before a right turn rather than move to the right at an appropriate time to make the right turn. However, this can be confusing to other vehicles (or their drivers) who may not understand based on such behavior that the vehicle is attempting to make a right turn. In many cases, using a turn signal may not be sufficient to signal this intent.

Moreover, simply having the vehicle move to the right at a fixed distance (in time or space) from the right turn can be dangerous, especially where there is a bicycle lane, parking spaces, or another vehicle also attempting to move to the right. This is presumably because that other vehicle also is making a right turn at the intersection. In that regard, it critical that the vehicle assess its environment and operate in a manner that signals intent of the vehicle to other road users, such as, for example, other vehicles, bicyclists, pedestrians.

In order to assess the vehicle's environment, the vehicle may be equipped with a perception system. The perception system may include various sensors which can detect and identify objects in the vehicle's environment. This sensor data may then be sent to the vehicle's computing devices for processing in real time.

In order to plan a route, the vehicle's computing devices may access map information that describes an expected state of the vehicle's environment. Using this information, the vehicle's computing devices may plan a route, for instance, which includes one or more turns or turning maneuvers at an intersection, into a parking lot, driveway etc.

The vehicle's computing devices may then identify which (if any) of the turns correspond to "wide lane" areas proximate to those turns. In right hand drive countries, as with the examples depicted in the figures, these turns are likely to be right turns. In left hand drive countries, these turns are likely to be left turns. In this regard, the vehicle's computing devices may access the detailed map information, and such areas may be flagged as wide lanes or identified based on whether the width of the lane in the map information meets a threshold distance. Alternatively, this information may be determined in real time based on detected distances between lane lines or between a lane line and a curb received from the perception system.

Once a wide lane area prior to a right turn is identified as the vehicle approaches the right turn, for instance from a predetermined distance in time or space, sensor data from the perception system may be analyzed to identify a set of objects having certain characteristics which would indicate that such objects are relevant to the vehicle's behavior before making the right turn. For instance, objects moving in the same lane as the vehicle in front of or behind the vehicle may be identified. In addition, the set of identified objects may be filtered to remove any objects that are simply too far away from the vehicle.

For any objects remaining in the set, the vehicle's computing device may determine whether the objects are going to proceed through the intersection (no turns) and/or make a left hand turn or alternatively, make a right turn. To do so, the sensor data from the perception system for any of the set of identified objects may be further analyzed.

Using this information, as well as the relative location of the other object, when the vehicle is a predetermined distance in time or space from making the right turn, the vehicle's computing devices may determine how to best maneuver the vehicle both to ensure the safety of any passengers (and the other object) as well as to signal the intent to make the right turn.

The features described herein allow a vehicle's computing devices to maneuver the vehicle is a safe and practical way. For instance, by maneuvering the vehicle as described above, the vehicle is able to position itself in a way that signals its intent to move to the right and complete a right turn which can be more effective than simply using a turn signal. At the same time, by moving over only in certain circumstances and allowing other vehicles to pass to the right of the vehicle where those other vehicles, the vehicle's computing devices may maneuver the vehicle in a safer and more socially acceptable way.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (for instance, a gas or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, lanes and heading information (identifying the headings or orientations of the lanes), intersections, crosswalks, speed limits, traffic signals, buildings, signs, real time traffic information, vegetation, or other such objects and information which is expected to persist. Thus, this information may be pre-stored, as opposed to being generated by the perception system 172 in real time. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

Figure 2:
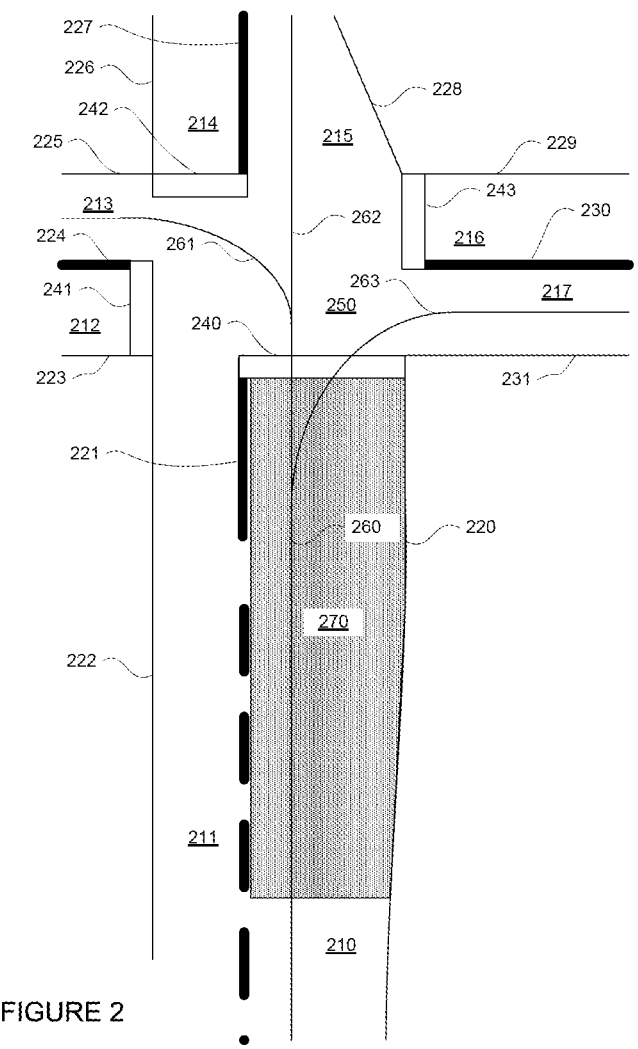
FIG. 2 is an example diagram of map information in accordance with aspects of the disclosure.
Figure 3A:
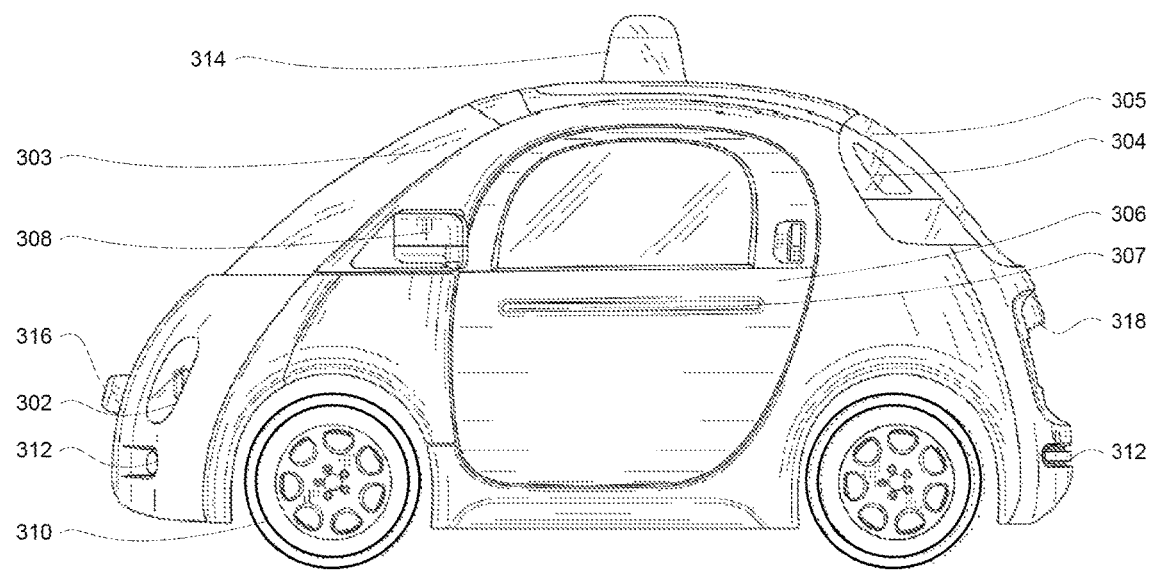
FIGS. 3A-3D are example external views of a vehicle in accordance with aspects of the disclosure.
Figures 3B, 3C:
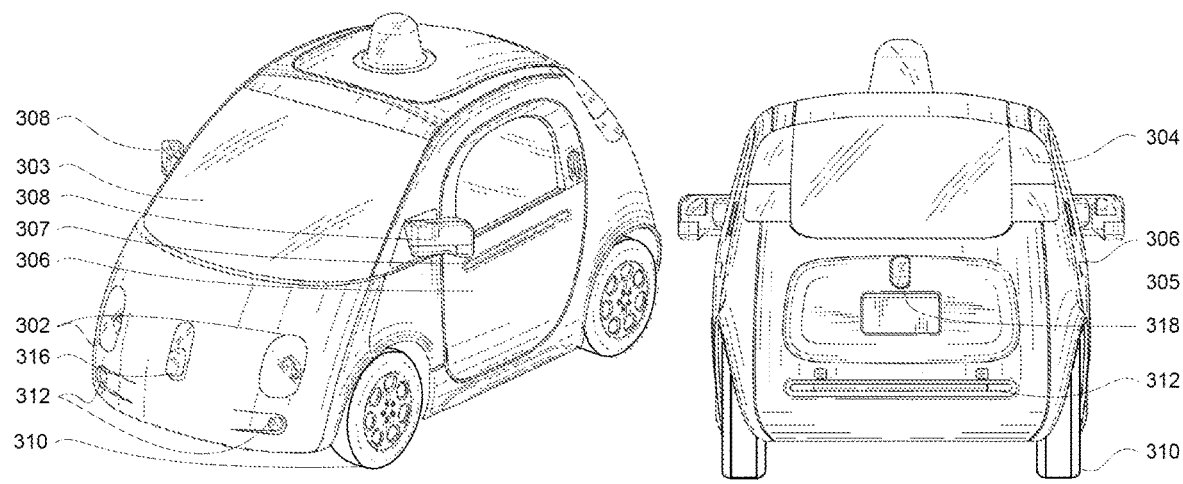
Figure 3D:
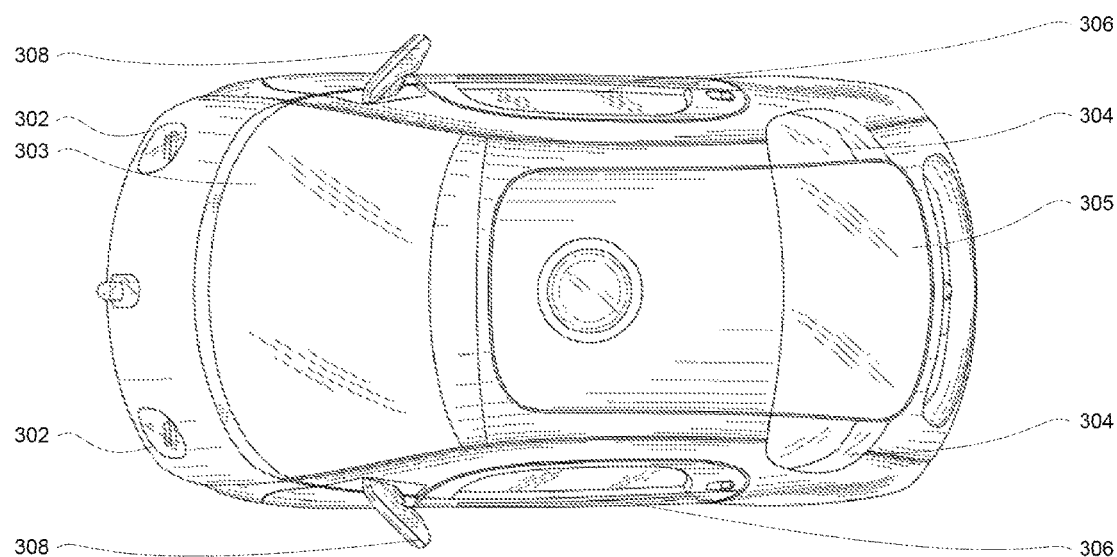

FIG. 2 is an example of map information for a section of roadway 200. In this regard, the map information includes information identifying the shape, location, and other characteristics of lanes 210, 211, 212, 213, 214, 215, 216, 217, bounded by lane markers 220, 221, 222, 223, 224, 225, 226, 227, 228, 229, 230, 231, bar lines 240, 241, 242, 243 which identify the beginning of an intersection, as well as intersection 250.

In some instances, the map information may even include information about how a vehicle should move through the map. For instance, FIG. 2 also includes a set of rails 260, 261, 262, 263 for a vehicle traveling in lane 210 towards intersection 250. These rails may act as guidelines for the vehicle's computing devices in order to maintain appropriate and safe position within a lane, through an intersection, etc. Returning to FIG. 2, by following different rails, the vehicle may make different maneuvers through the intersection 250, such as a left turn (by following rail 260 to rail 261), proceeding through the intersection (by following rail 260 to rail 262), or a right turn (by following rail 260 to rail 263). Of course, the vehicle may deviate from these rails where there is another object in the way or other circumstance, such as a construction area, which would prevent the vehicle from safely following a rail.

In this example, the map information also identifies or flags areas of the map immediately prior to an intersection (or parking lot into which the vehicle may turn) having particular characteristics. For instance, the map information may identify areas as "wide lanes." In such cases, the characteristics of area may be such that the width of the lane in the map information meets a threshold distance, for instance, a width great enough for two vehicles, such as 16 feet or more or less, or which would be of a sufficient distance to fit an object (such as a detected vehicle) and the vehicle 100 side by side within the area. As shown in FIG. 2, the map information identifies area 270 as a wide lane area which meets the threshold distance.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include sensors such as LIDAR (lasers), sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use the various sensors to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated with the signaling system 166. Light bar 307 may also be associated with the signaling system 166.

Vehicle 100 also includes sensors of the perception system 172. For example, housing 314 may include one or more laser devices having 360 degree or narrower fields of view and one or more camera devices. Housings 316 and 318 may include, for example, one or more radar and/or sonar devices. The devices of the perception system 172 may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing devices 110.

The computing devices 110 may control the direction and speed of the vehicle by controlling various components. By way of example, computing devices 110 may navigate the vehicle to a destination location completely autonomously using data from the detailed map information, perception system 172, and routing system 168. In order to maneuver the vehicle, computing devices 110 may cause the vehicle to accelerate (e.g., by increasing fuel or other energy provided to the power system 174 or engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Once a passenger or cargo, is safely in or has safely left the vehicle, the computing devices 110 may initiate the necessary systems to control the vehicle autonomously along a route to a destination location. Many routes may include turns at intersection or other locations (such as parking lots, etc.). In order to follow the route, the routing system 168 may use the map information of data 134 to determine a path or route to the destination location that follows a set of the rails of the map information. The computing devices 110 may then maneuver the vehicle autonomously (or in an autonomous driving mode) as described above along the route towards the destination.

Figure 4:
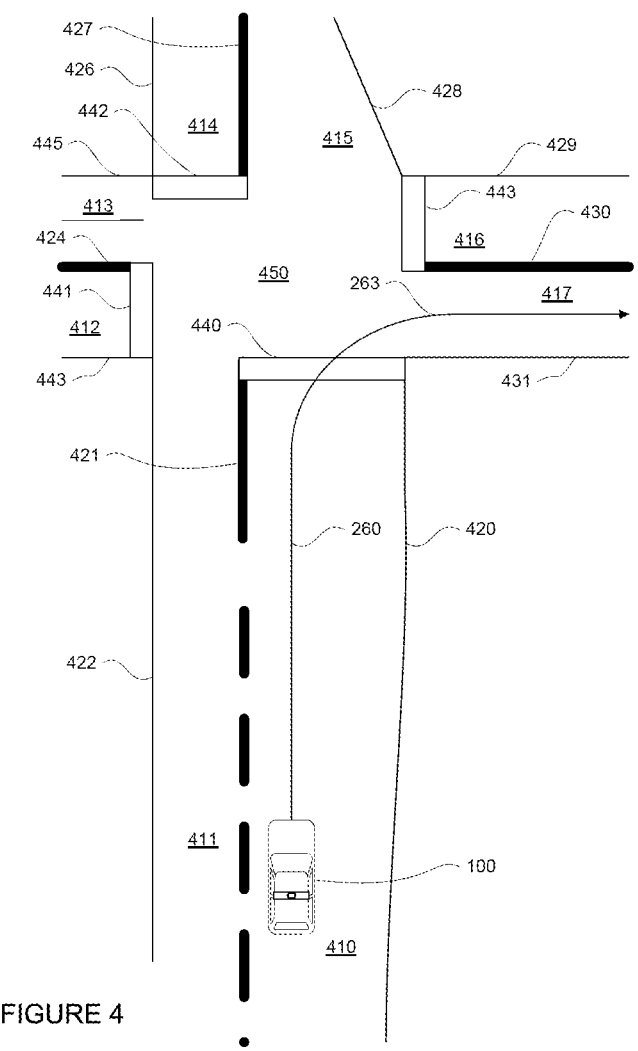
FIGS. 4-10 are example views of vehicles on a roadway corresponding to the map information and data of FIG. 2 in accordance with aspects of the disclosure.

FIG. 4 depicts a section of roadway 400 corresponding to the section of roadway 400 of the map information. For instance, the shape, location, and other characteristics of lanes 410, 411, 412, 413, 414, 415, 416, 417, bounded by lane markers 420, 421, 422, 423, 424, 425, 426, 427, 428, 429, 430, 431, bar lines 440, 441, 442, 443 which identify the beginning of an intersection, as well as intersection 450 correspond to the shape, location, and other characteristics of lanes 210, 211, 212, 213, 214, 215, 216, 217, bounded by lane markers 220, 221, 222, 223, 224, 225, 226, 227, 228, 229, 230, 231, bar lines 240, 241, 242, 243 which identify the beginning of an intersection, as well as intersection 250, respectively. In this example, vehicle 100 is traveling in lane 410 towards an intersection 450 and is following a route that involves following rail 260 towards rail 263 in order to make a right turn at intersection 450. Of course, the rails represent data from the map information and are not part of the section of roadway 400.

As noted above, the computing devices may maneuver the vehicle in order to follow a predetermined path which causes the vehicle to stay "centered" in the lane by maintaining a distance from a center or left side lane line or following a map guide lines or rails discussed above. In this regard, as vehicle 100 approaches intersection 450 in lane 410, the computing devices 110 may control vehicle according to the rails 260 and 263 in order to make a right turn at intersection 450. Because the computing devices 110 will cause the vehicle 100 to follow the rails, with only small deviations as discussed above for safety, the vehicle may actually tend to stay to the left as a lane widens before a right turn rather than move to the right at an appropriate time to make the right turn. Again, this can be confusing to other vehicles (or their drivers) who may not understand based on such behavior that the vehicle is attempting to make a right turn. In many cases, using a turn signal may not be sufficient to signal this intent.

The computing device 110 may thus also control the movements of the vehicle 100 in order to better signal "intent" of the computing devices. To do so, the vehicle's computing devices may then identify which (if any) of the turns include the vehicle maneuvering through a wide lane area proximate to those turns. In right hand drive countries, as with the examples depicted in the figures, these turns are likely to be right turns. In left hand drive countries, these turns are likely to be left turns. In this regard, the computing devices 110 may access the detailed map information corresponding to section of roadway 200 to identify any wide lane areas proximate to turns which the vehicle will make in order to follow the route. Thus, using the example of FIG. 4, for the turn at intersection 250, the computing device 110 may identify area 270 of lane 210 (shown in FIG. 2), corresponding to lane 410, immediately prior to intersection 250 and lane 217 at which the vehicle will make a turn in order to follow the route. This may be repeated for all turns of the route. Alternatively, wide lane areas may be determined by the computing devices in real time based on information from the perception system 172. For example by determining distances between detected lane lines or between a lane line and a curb identified in the sensor data, the computing devices may identify such wide lane areas.

Once a wide lane area prior to a turn is identified, as the vehicle approaches the wide lane area and/or the turn, for instance from a predetermined distance in time or space, sensor data from the perception system 172 may be analyzed to identify a set of objects having certain characteristics. For example, the computing devices 110 may analyze the sensor data to identify characteristics of objects which would indicate that such objects are relevant to the vehicle's behavior before making the right turn. Relevant object may include objects moving in the same lane as the vehicle in front of or behind the vehicle may be identified. In addition, the set of identified objects may be filtered to remove any objects that are simply too far away from the vehicle. For instance, if an object is 8 seconds or 200 feet away, such an object may be discarded from the set.

For any objects remaining in the set, the vehicle's computing device may determine whether the objects are going to proceed through the intersection (no turn) and/or make a left turn at the intersection or alternatively, make a right turn at the intersection. To do so, the sensor data from the perception system for any of the set of identified objects may be further analyzed. As an example, the sensor data may be analyzed to identify whether the object is using a turn signal which would indicate a left or right turn.

Using this information, as well as the relative location of the other object, when the vehicle is the predetermined distance in time or space from the intersection or where the vehicle will need to make the turn, the vehicle's computing devices may determine how to best maneuver the vehicle both to ensure the safety of any passengers (and the other object) as well as to signal the intent to make the right turn (in addition to lighting a turn signal light to indicate the change in heading).

Figure 5:
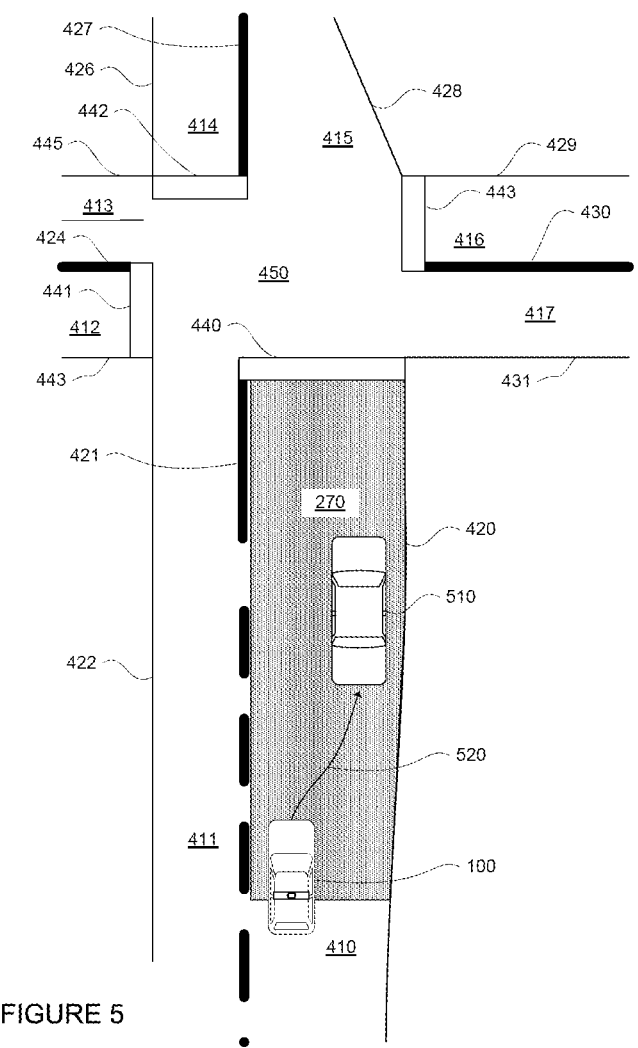

For instance, when the other object is in front of the vehicle and appears to be planning to make a right turn, such as, for example, where the other object is using a right turn signal, moving to the right, or is already stopped at an intersection, the vehicle's computing devices may maneuver the vehicle to move to the right immediately and to stay behind the other object. For instance, FIG. 5 corresponds to the example of FIG. 5 with the addition of vehicle 510 traveling in lane 410 towards intersection 450. As shown, vehicle 510 is within the area 270 but remains closer to lane line 420 than lane line 421. As such, the computing devices may determine that as vehicle 510 appears to be staying towards the right of lane 410, vehicle 510 is very likely to make a right turn. In addition, other information of the sensor data, such as the identification of an illuminated or active right turn signal, may further indicate that the vehicle 510 is very likely to make a right turn. Accordingly, the computing devices 110 may maneuver the vehicle 100 in order to follow arrow 520, thereby moving towards lane line 420, away from lane line 421, and directly behind vehicle 510, until the vehicle 100 reaches the intersection 450 and makes the turn into lane 417.

Figure 6:
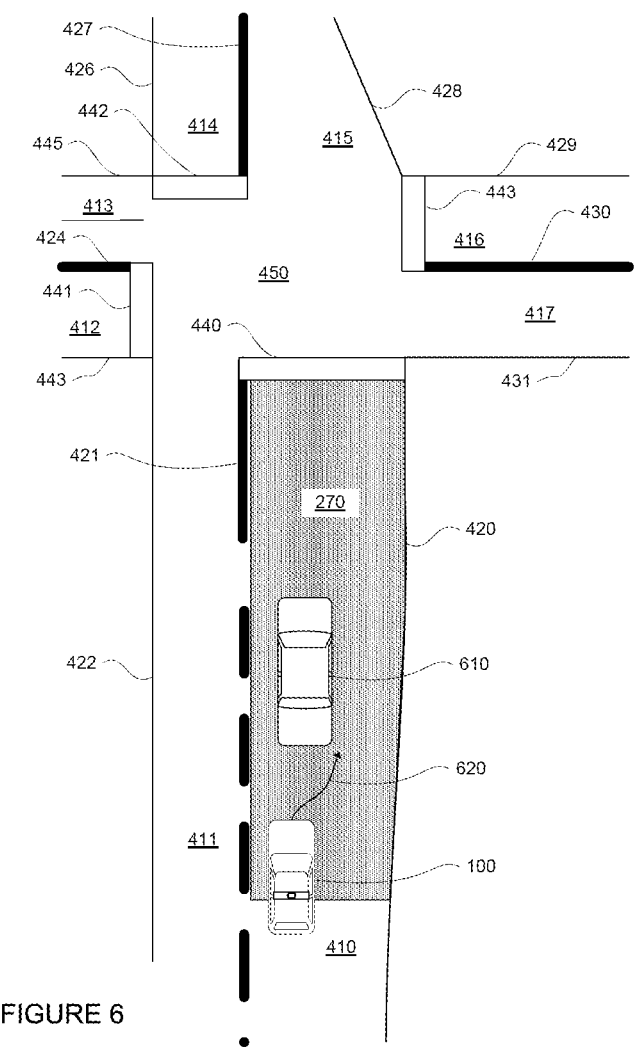
Figure 7:
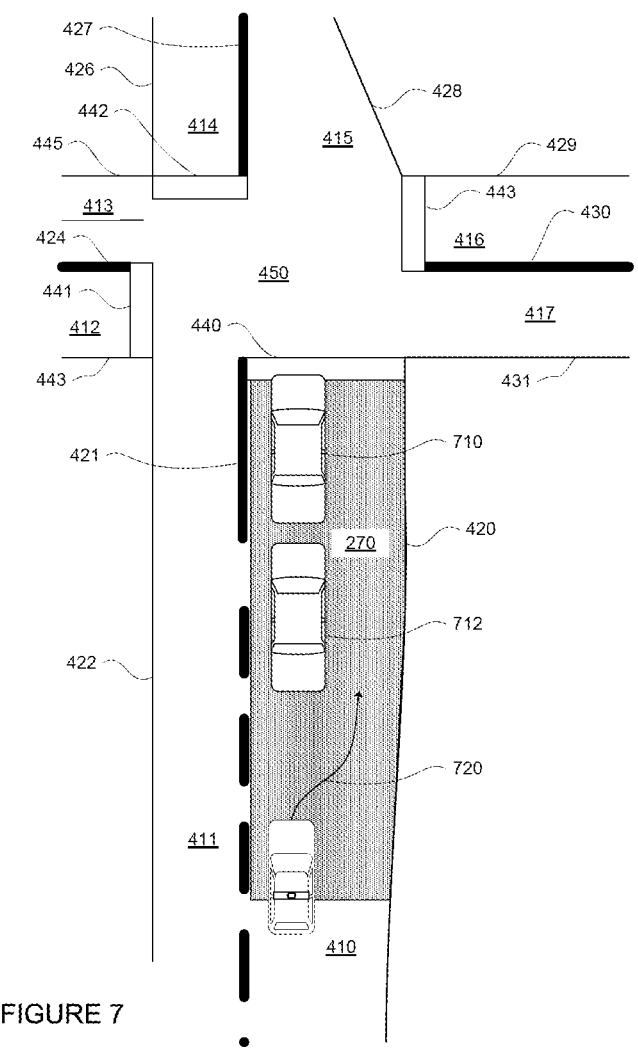

If the other object in front of the vehicle is staying in the center or towards the left of the lane, the vehicle's computing devices may maneuver the vehicle to move to the right immediately and to stay behind the other object. For instance, FIG. 6 corresponds to the example of FIG. 4 with the addition of vehicle 510 traveling in lane 410 towards intersection 450. As shown, vehicle 610 is within the area 270 but remains closer to lane line 421 than lane line 420. As such, the computing devices 110 may determine that vehicle 610 appears to be staying towards the left of lane 410. Accordingly, the computing devices 110 may maneuver the vehicle 100 in order to follow arrow 620, thereby moving towards lane line 420 and away from lane line 421. In addition, given that vehicle 510 is in front of vehicle 100, in order to reduce the likelihood of a collision if vehicle 610 were to also move towards lane line 420, the computing devices 110 may maneuver vehicle 100 in order to remain behind vehicle 510, until the vehicle 100 reaches the intersection 450 and makes the turn into lane 417.

Where the other object appears to be one of a series of "stacked" vehicles stopped at the intersection towards the left of the lane, the vehicle's computing devices may maneuver the vehicle to the right more slowly, proceeding to the right of the other vehicle only if the other vehicle is stopped, moving very slowly, or not otherwise in the way. For instance, FIG. 7 corresponds to the example of FIG. 4 with the addition of vehicles 710 and 712 traveling in lane 410 towards intersection 450. As shown, vehicles 710 and 712 are within the area 270 but remain closer to lane line 421 than lane line 420. As such, the computing devices 110 may determine that vehicles 710 and 712 appear to be staying towards the left of lane 410 and arranged one behind the other in the aforementioned "stacked" configuration. Accordingly, the computing devices 110 may maneuver the vehicle 100 in order to follow arrow 720, thereby moving towards lane line 420 and away from lane line 421. In addition, given that vehicle 712 is in front of vehicle 100, in order to reduce the likelihood of a collision if vehicle 610 were to also move towards lane line 420, the computing devices 110 may maneuver vehicle 100 in order to remain behind vehicle 712, until the vehicle 100 reaches the intersection 450 and makes the turn into lane 417.

Figure 8:
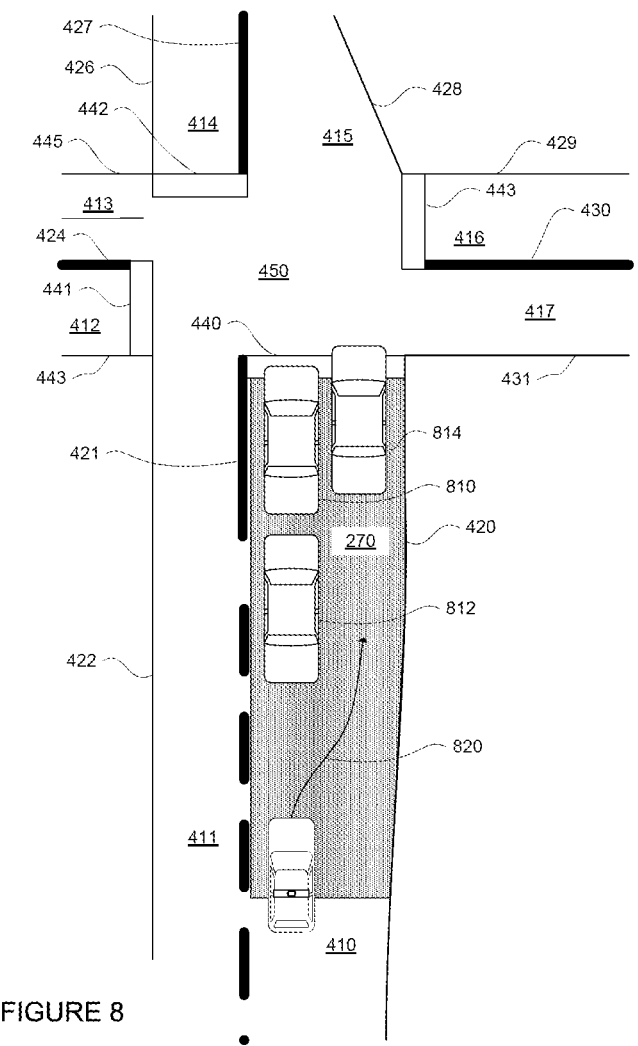

If the vehicles are stopped at the intersection towards both the left and right of the lane, the vehicle's computing devices may maneuver the vehicle to pull behind the vehicles to the right, but proceeding with caution if the vehicle is passing any objects on the right. For instance, FIG. 8 corresponds to the example of FIG. 4 with the addition of vehicles 810, 812, and 814 traveling in lane 410 towards intersection 450. As shown, vehicles 810 and 812 are within the area 270 but remain closer to lane line 421 than lane line 420, while vehicle 814 is within the area 270 but remains closer to lane line 420 than lane line 421. IAs such, the computing devices 110 may determine that the vehicles 710 and 720 appear to be staying towards the left of lane 410 and arranged one behind the other in the aforementioned "stacked" configuration. In addition, vehicle 814 is positioned to the right of vehicle 810, and is thus likely to make a right turn.

This positioning of vehicles 810 and 814 may indicate that it is likely that vehicle 810 and 814 will take different actions when entering the intersection 450. For example, the computing devices 110 may determine that vehicle 810 may be likely to make a left turn (the likelihood of which may be greater if the sensor data indicates that a left turn signal of vehicle 810 is activated), while vehicle 814 may be likely to make a right turn (the likelihood of which may be greater if the sensor data indicates that a right turn signal of vehicle 814 is activated). Alternatively, the computing devices 110 may determine that vehicle 810 may be likely to make a left turn (the likelihood of which may be greater if the sensor data indicates that a left turn signal of vehicle 810 is activated), while vehicle 814 may be likely to proceed to lane 415 through the intersection (the likelihood of which may be greater if the sensor data indicates that no turn signal of vehicle is activated). In yet another alternative, the computing devices 110 may determine that vehicle 810 may be likely to proceed through the intersection to lane 415 (the likelihood of which may be greater if the sensor data indicates that no turn signal of vehicle 810 is activated), while vehicle 814 may be likely to make a right turn (the likelihood of which may be greater if the sensor data indicates that a right turn signal of vehicle 814 is activated).

Figure 9:
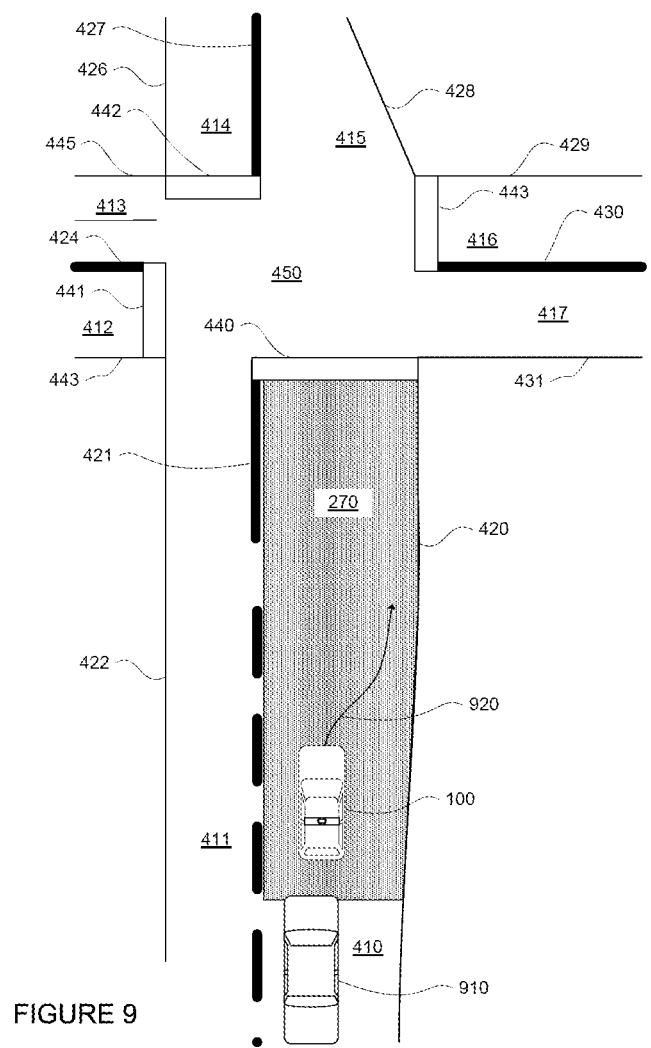

Accordingly, the computing devices 110 may maneuver the vehicle 100 in order to follow arrow 820, thereby moving towards lane line 420 and away from lane line 421. In addition, given that vehicle 814 is adjacent to vehicle 810, the computing devices 110 may maneuver vehicle 100 around vehicle 812 and immediately behind vehicle 814. Of course, in order to reduce the likelihood of a collision if vehicle 812 were to also move towards lane line 420, the computing devices 110 may maneuver vehicle 100 very cautiously around vehicle 812 and towards vehicle 814 until the vehicle 100 reaches the intersection 450 and makes the turn into lane 417.

Where the other object is behind the vehicle, not only must the vehicle signal its intent, but the vehicle's computing devices must be able to determine the intent of the other object. For example, where the other object is directly behind the vehicle and/or slightly to the left, the vehicle's computing device may move the vehicle to the right immediately. For instance, FIG. 9 corresponds to the example of FIG. 4 with vehicle 100 being slightly closer to intersection 450 and the addition of vehicle 910 traveling in lane 410 towards intersection 450. As shown, vehicle 100 is within area 270 and vehicle 910 is just entering (or approaching) area 270. Accordingly, the computing devices 110 may maneuver the vehicle 100 in order to follow arrow 920, thereby moving towards lane line 420 and away from lane line 421 relatively quickly, or in reality, before vehicle 910 is able to maneuver itself to the right of vehicle 100.

Figure 10:
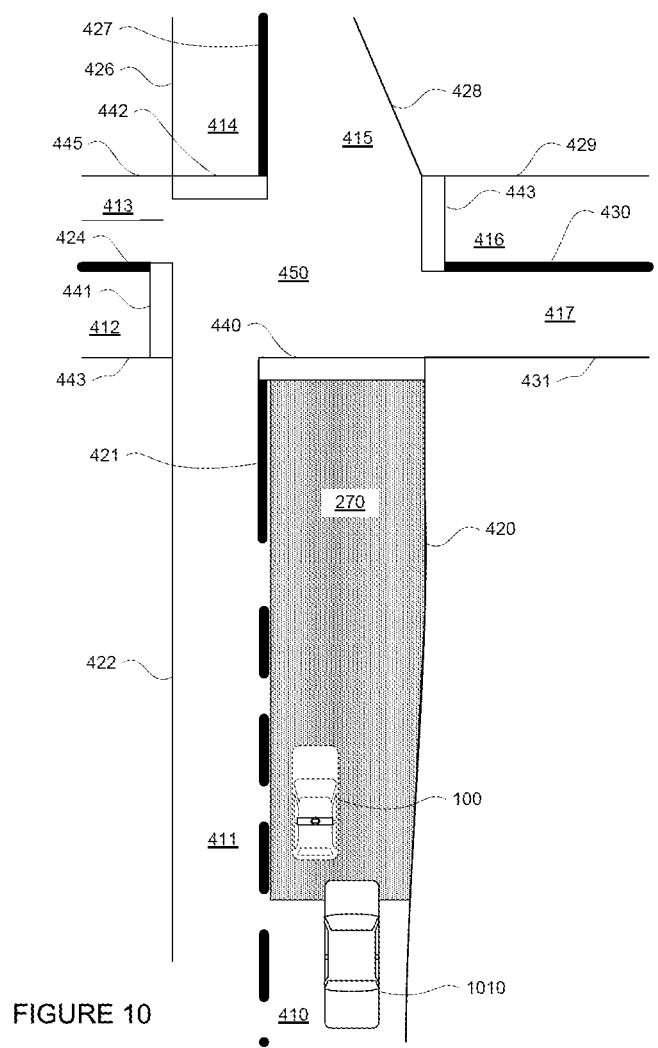

FIG. 10 corresponds to the example of FIG. 4 with vehicle 100 being slightly closer to intersection 450 and the addition of vehicle 1010 traveling in lane 410 towards intersection 450. As shown, vehicle 100 is within area 270 and vehicle 910 is at least partially within area 270. In this case, where the other object, here vehicle 1010, is slightly to the right of vehicle 100 and is likely to pass on the right of vehicle 100 in order to make a right turn. In such a situation, it may be that the other object is actually attempting to overtake the vehicle. In this situation, rather than getting to the right immediately, as in the example of FIG. 9, it may be safer for the computing devices 110 to maintain vehicle 100's current speed or slowdown in order to allow the other object to pass, and then move to the right immediately after the other object has passed. In addition to the other object's relative location, the vehicle's computing devices may also consider the speed of the other object. If the speed is slower than the vehicle and there is sufficient room to do so, the vehicle's computing devices may actually maneuver the vehicle to the right immediately. Other behaviors, such as whether the other object is honking may also be considered as a factor to allow the other object to pass.

In addition, before moving to the right, the vehicle's computing devices may also consider whether there are any unoccupied parking spaces or bicycle lanes to the right. In such situations, the computing devices 110, rather than pulling vehicle 100 completely to the right, may pull only partially across a lane marker for parking spot or directly adjacent the bicycle lane in order to signal the intent to move to the right, but to avoid passing into these areas.

Figure 11:
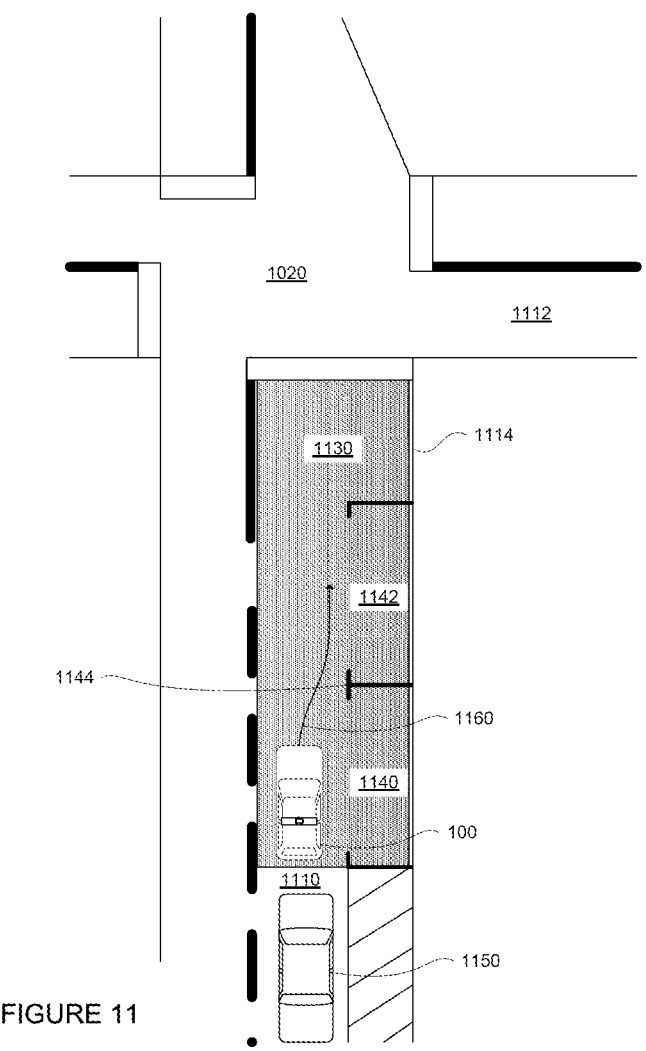
FIG. 11 is an example view of vehicles on another roadway and data in accordance with aspects of the disclosure.

For instance, FIG. 11 depicts vehicle 100 moving in a lane 1110 towards an intersection 1120 in order to make a right turn into lane 1112. In this example, vehicle 100 is moving through a wide lane area 1130 that may be identified in the map information or in real time based on the sensor data. There are two parking spaces 1140 and 1142 (which may be identified in the map information as well. In addition, a vehicle 1150 is located behind vehicle 100. Accordingly, computing devices 110, may maneuver vehicle 100 only partially across a part (for instance, an outside edge 1144) of either one or both of parking spaces 1140 and 1142, following arrow 1160 towards lane line 1114, in order to signal the intent to move to the right, but to avoid passing into the parking spot.

Figure 12:
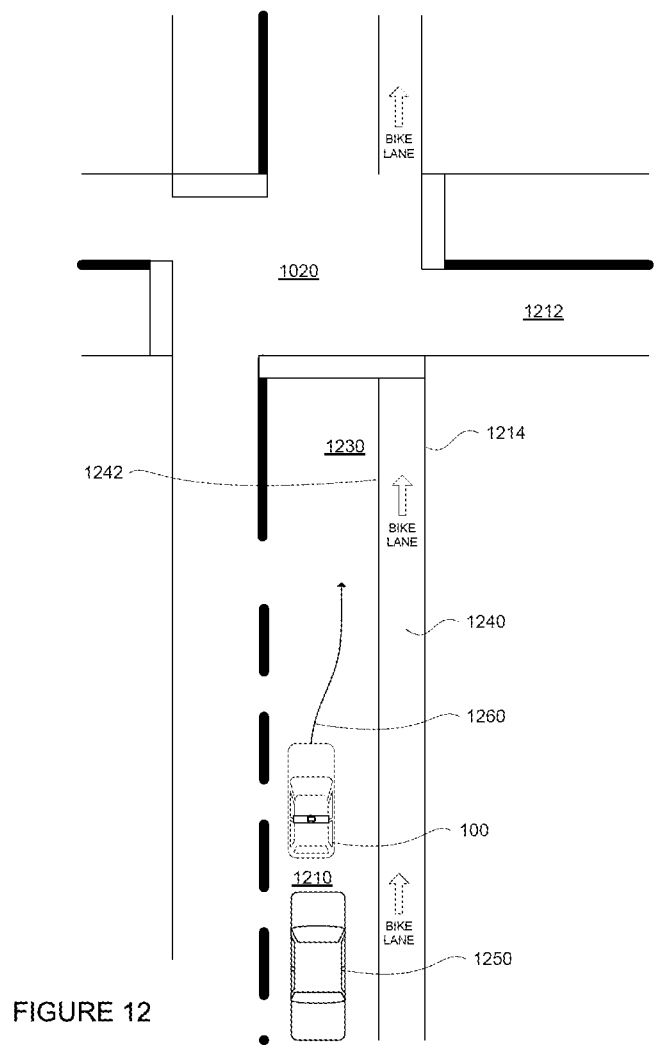
FIG. 12 is an example view of vehicles on a further roadway and data in accordance with aspects of the disclosure.

Similarly, FIG. 12 depicts vehicle 100 moving in a lane 1210 towards an intersection 1220 in order to make a right turn into lane 1212. In this example, vehicle 100 is moving through a wide lane area 1230 that may be identified in the map information or in real time based on the sensor data. There is also a bicycle lane 1240 to the right of vehicle 100 in the area which may be identified in the map information as well. In addition, a vehicle 1250 is located behind vehicle 100. Accordingly, the computing devices 110, may maneuver vehicle 100 only partially across an outside edge 1242 of the bicycle lane 1240, following arrow 1260 towards lane line 1214 in order to signal the intent to move to the right, but to avoid passing into the parking spot.

In addition or alternatively, the data may be analyzed to determine whether the object appears to be following another object. For instance, if a first object appears to be following the trajectory of a second object, such as where the trajectories follow the same general shape or pass through points within a short predetermined distance of one another, this may be a signal that the first object is lining up behind the second object in order to proceed in the same manner. In other words, both objects are making a right turn or both proceeding straight through the intersection. Again, this may be used to determine how to maneuver the vehicle prior to making the turn.

Figure 13:
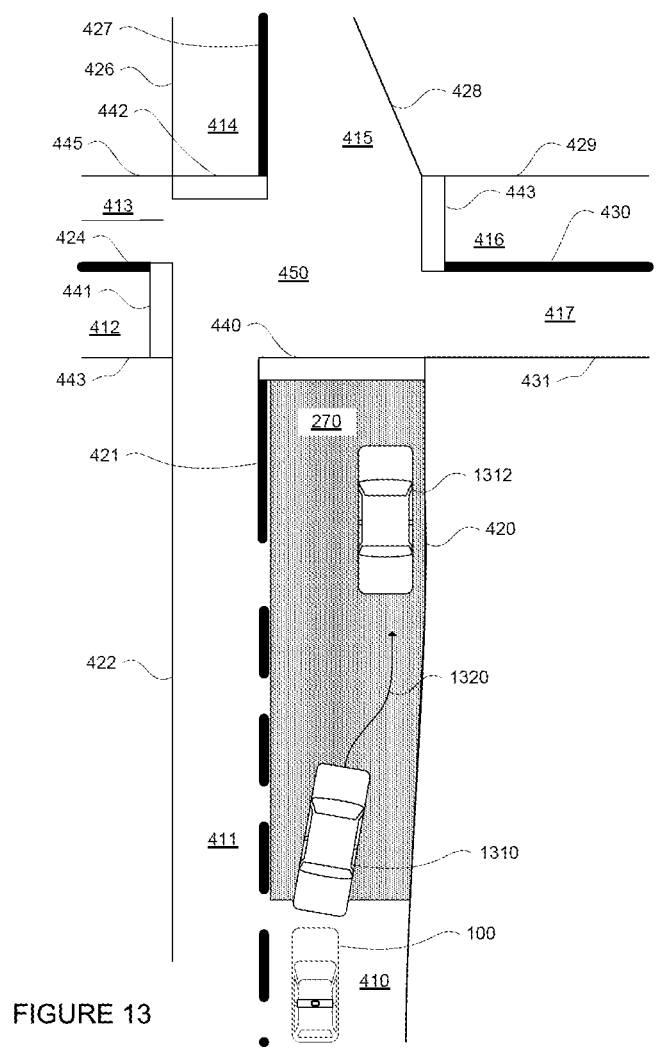
FIG. 13 is another example view of vehicles a roadway corresponding to the map information and data of FIG. 2 in accordance with aspects of the disclosure.

For instance, FIG. 13 corresponds to the example of FIG. 4 with the addition of vehicles 1310 and 1312 traveling in lane 410 towards intersection 450. As shown, vehicles 1310 and 1312 are within the area 270 but are closer to lane line 421 than lane line 420. This may indicate that vehicle 1312 is "lining" up behind vehicle 1312. In this example, the position of vehicle 1312 within area 270 proximate to lane line 420 may indicate that vehicle 1312 is likely to turn right into lane 417 at intersection 450. This likelihood may be increased if the sensor indicates that a right turn signal of vehicle 1312 is activated. In this example, vehicle 1310 appears to be following trajectory 1320 which was traveled immediately before by vehicle 1312 in order to reach the position of vehicle 1312 as shown in FIG. 13. As such, the computing devices 110 may determine that vehicle 1312 is also likely to make a right turn into lane 417 at intersection 450. The computing devices 110 may then use this information to maneuver vehicle 100. This likelihood may be increased if the sensor indicates that a right turn signal of vehicle 1310 is activated. Thus, in the example of FIG. 13, the computing devices 110 may maneuver vehicle to also follow trajectory 1320 or to move towards lane line 420 even faster than trajectory 1320 would allow, though remaining at least a predetermined distance behind vehicle 1310 for safety.

Accordingly, the computing devices 110 may maneuver the vehicle 100 in order to follow arrow 720, thereby moving towards lane line 420 and away from lane line 421. In addition, given that vehicle 712 is in front of vehicle 100, in order to reduce the likelihood of a collision if vehicle 610 were to also move towards lane line 420, the computing devices 110 may maneuver vehicle 100 in order to remain behind vehicle 722, until the vehicle 100 reaches the intersection 450 and makes the turn into lane 417.

Exact paths, distances, and/or points within a particular wide lane area to begin maneuvering the vehicle to the right may be identified using machine learning techniques and reviewing sensor data from prior right turns from wide lanes. This may recording and examining how far and/or quickly other vehicles shifted to the right in similar situations at the same or similar areas.

Although the examples above relate to right hand turns at intersections, such turns may also occur where the vehicle is entering a parking lot. In addition, the examples herein relate to right turns in right-hand drive countries, but would be equally as relevant to left turns in left-hand drive countries.

Figure 14:
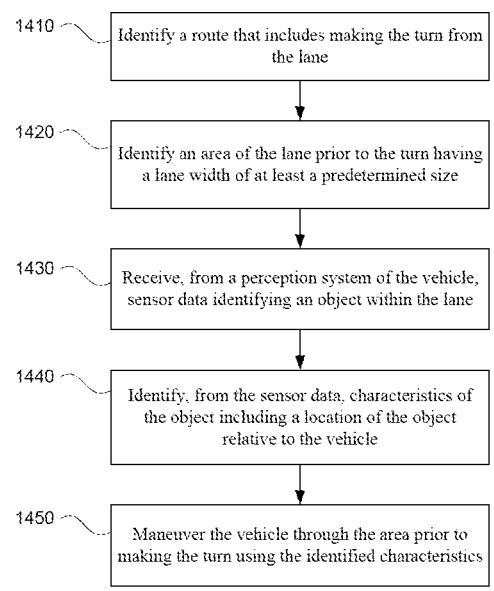
FIG. 14 is an example flow diagram in accordance with aspects of the disclosure.

FIG. 14 is an example flow diagram 1400 in accordance which may be performed by one or more processors of one or more computing devices of a vehicle, such as computing devices 110 of vehicle 100, in order to maneuver a vehicle prior to making a turn. In this example, a route that includes making the turn from the lane is identified at block 1410. An area of the lane prior to the turn having a lane width of at least a predetermined size is identified at block 1420. Sensor data identifying an object within the lane is received from a perception system of the vehicle at block 1430. Characteristics of the object including a location of the object relative to the vehicle are identified from the sensor data at block 1440. The vehicle is maneuvered through the area prior to making the turn using the identified characteristics at block 1450.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method comprising:
 accessing, by one or more processors of a vehicle, map information stored in a memory of the vehicle, the map information identifying an area of a lane of a roadway prior to an intersection, the area of the lane having a predetermined width between a first edge of the lane and a second edge of the lane;

receiving, by the one or more processors, from a perception system of the vehicle, sensor data identifying one or more objects proximate to the vehicle;

determining, by the one or more processors, to which of the first edge or the second edge of the area of the lane prior to the intersection that the one or more objects is closer;

predicting, by the one or more processors, from the sensor data, how the one or more objects will maneuver in the area of the lane prior to the intersection that is identified by the map information and whether the one or more objects will make a turn at the intersection from the lane based on the determining; and maneuvering, by the one or more processors, the vehicle in order to signal the vehicle's intent to make the turn at the intersection from the lane based on the predicting.

2. The method of claim 1, wherein the sensor data indicates a relative location of each of the one or more objects with respect to a current location of the vehicle.

3. The method of claim 2, wherein the vehicle's intent is signaled based on the current location of the vehicle reaching a predetermined distance from the intersection.

4. The method of claim 1, wherein the vehicle's intent is signaled based on the one or more processors determining that the vehicle will arrive at the intersection within a predetermined amount of time.

5. The method of claim 1, wherein the vehicle and the one or more objects turn at the intersection.

6. The method of claim 1, further comprising:
analyzing, by the one or more processors, the sensor data to identify certain characteristics of the one or more objects.

7. The method of claim 6, wherein the characteristics include one or more of orientation, size, shape, type, direction or speed of movement.

8. The method of claim 6, further comprising:
removing, by the one or more processors, at least one of the one or more identified objects that are at least a predetermined distance from the vehicle.

9. The method of claim 6, wherein the characteristics include an illuminated or active turn signal, and the maneuvering is based on the characteristics of the objects.

10. The method of claim 6, wherein the maneuvering includes following behind one or more of the objects.

11. The method of claim 1, wherein the first edge of the lane is defined by a first lane line.

12. The method of claim 11, wherein the second edge of the lane is defined by a second lane line.

13. A system comprising:
a memory configured to store map information identifying an area of a lane of a roadway prior to an intersection, the area of the lane having a predetermined width between a first edge of the lane and a second edge of the lane;
a perception system; and
one or more processors configured to:
access the map information stored in the memory;
receive, from the perception system, sensor data identifying one or more objects proximate to a vehicle;
determine to which of the first edge or the second edge of the area of the lane prior to the intersection that the one or more objects is closer;
predict, from the sensor data, how the one or more objects will maneuver in the area of the lane prior to the intersection that is identified by the map information and whether the one or more objects will make a turn at the intersection from the lane based on the determining; and
maneuver, by the one or more processors, the vehicle in order to signal the vehicle's intent to make the turn at the intersection from the lane based on the predicting.

14. The system of claim 13, wherein the sensor data indicates a relative location of each of the one or more objects with respect to a current location of the vehicle.

15. The system of claim 14, wherein the vehicle's intent is signaled based on the current location of the vehicle reaching a predetermined distance from the intersection.

16. The system of claim 13, wherein the vehicle's intent is signaled based on the one or more processors determining that the vehicle will arrive at the intersection within a predetermined amount of time.

17. The system of claim 13, wherein the vehicle and the one or more objects turn at the intersection.

18. The system of claim 13, wherein the one or more processors are configured to analyze the sensor data to identify characteristics of the one or more objects.

19. The system of claim 18, wherein the characteristics include one or more of orientation, size, shape, type, direction or speed of movement.

20. The system of claim 18, wherein the one or more processors are configured to remove at least one of the identified one or more objects that are at least a predetermined distance away from the vehicle.

21. The system of claim 18, wherein the characteristics include an illuminated or active turn signal, and the one or more processors are configured to maneuver the vehicle based on the characteristics of the objects.

22. The system of claim 18, wherein the one or more processors are configured to maneuver the vehicle by following behind one or more of the objects.

23. A vehicle comprising:
a memory configured to store map information identifying an area of a lane of a roadway prior to an intersection that has a predetermined width between a first edge of the lane and a second edge of the lane;
a perception system; and
one or more processors configured to:
access the map information stored in the memory;
receive, from the perception system, sensor data identifying one or more objects proximate to the vehicle;
determine to which of the first edge or the second edge of the area of the lane prior to the intersection that the one or more objects is closer;
predict, from the sensor data, how the one or more objects will maneuver in the area of the lane prior to the intersection that is identified by the map information and whether the one or more objects will make a turn at the intersection from the lane based on the determining; and
maneuver, by the one or more processors, the vehicle in order to signal the vehicle's intent to make the turn at the intersection from the lane based on the predicting.

* * * * *

UNITED STATES PATENT AND TRADEMARK OFFICE
CERTIFICATE OF CORRECTION

| | |
|---|---|
| PATENT NO. | : 11,938,967 B2 |
| APPLICATION NO. | : 17/215574 |
| DATED | : March 26, 2024 |
| INVENTOR(S) | : Benjamin Charrow and Nathaniel Fairfield |

It is certified that error appears in the above-identified patent and that said Letters Patent is hereby corrected as shown below:

In the Claims

Claim 9, Column 15, Line 45:
Now reads: "the objects" should read -- the one or more objects --

Claim 10, Column 15, Line 47:
Now reads: "one" should read -- the one --

Claim 21, Column 16, Line 38:
Now reads: "the objects" should read -- the one or more objects --

Claim 22, Column 16, Line 41:
Now reads: "one" should read -- the one --

Signed and Sealed this
Fourteenth Day of May, 2024

Katherine Kelly Vidal
*Director of the United States Patent and Trademark Office*